June 17, 1930.                J. C. MEEM                1,764,461
                              CONVEYER
                        Filed Jan. 25, 1929
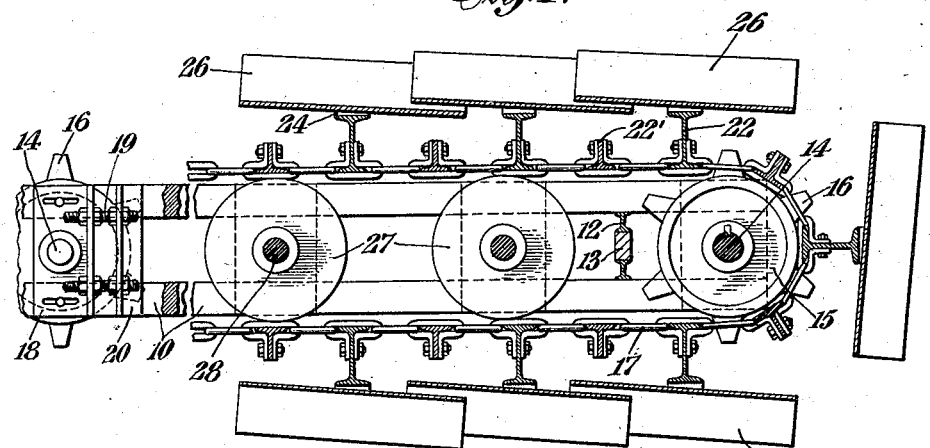
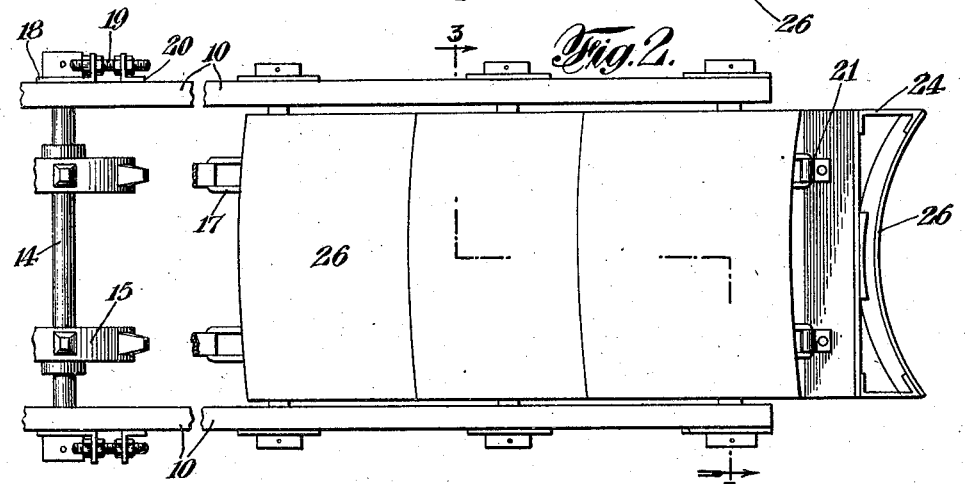
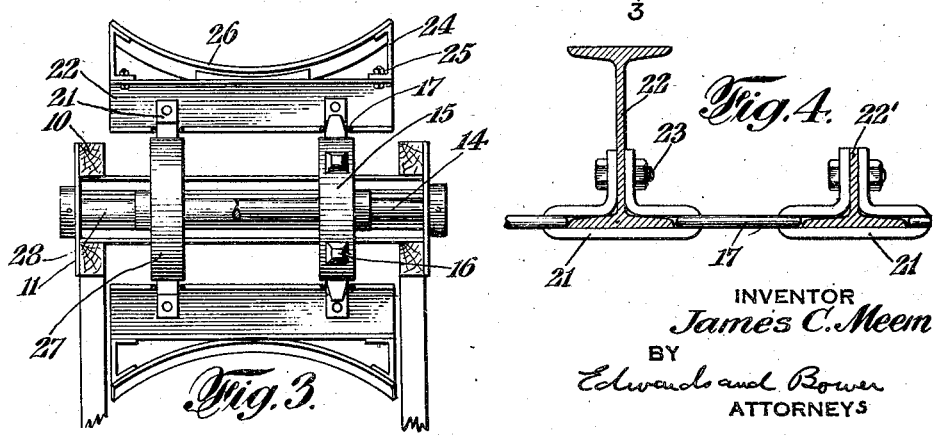
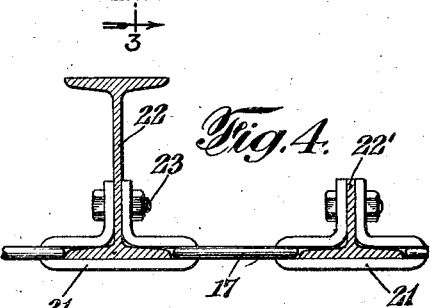
INVENTOR
James C. Meem
BY
Edwards and Bower
ATTORNEYS Patented June 17, 1930

1,764,461

UNITED STATES PATENT OFFICE

JAMES C. MEEM, OF BROOKLYN, NEW YORK

CONVEYER

Application filed January 25, 1929. Serial No. 334,922.

This invention relates to endless sectional conveyers and more particularly to conveyers which may be readily adjusted to various lengths and provided with interchangeable and removable sections.

The object of this invention is to provide a simple, inexpensive, endless sectional conveyer which is readily assembled to any desired length and which is adapted to convey heavy loads such as sand, gravel, bricks, and the like.

A further object of the invention is to provide an endless sectional conveyer provided with interchangeable sections so that the conveyer can be readily converted from a horizontal moving conveyer to a vertically lifting conveyer.

Further objects and advantages will be apparent from the following specification and drawings in which Fig. 1 is a sectional view of a conveyer constructed in accordance with this invention.

Fig. 2 is a plan view of Fig. 1 with portions broken away for clearness.

Fig. 3 is a sectional view taken on line 3—3 of Fig. 2, and

Fig. 4 is an enlarged, detailed sectional view.

In the drawings the supporting frame work is constructed of longitudinal supports 10 spaced longitudinally by any suitable supports such as supporting framework 11. At spaced intervals the supports 10 are spaced laterally of the conveyer by lateral supports 12 secured thereto by I beams 13 bolted or otherwise secured thereto. This entire supporting framework can be constructed of any desired length as the longitudinal supports 10 are provided in standard lengths and therefore can be inserted and removed as desired with the necessary supporting framework 11 and lateral supports 12.

At each end and extending laterally of the conveyer frame structure is a shaft 14 supported for rotation. Keyed or otherwise secured at each end of each shaft 14 is a sprocket 15 adapted to rotate with the shafts. These sprockets are provided with teeth 16 which fit within the horizontal links 17 of the endless parallel chains for moving the conveyer as a unit at any desired speed. One or both of the shafts 14 is provided with an adjustment for taking up the slack of the chains consisting of a frame 18 for the shaft adjustable longitudinally of the supports 10 by means of adjusting screw 19 threaded into frame 18 at one end and at the opposite end into frame 20 rigidly secured to longitudinal members 10.

The links 21 of the chains are open and flattened to conform substantially to the shape of the lateral members 22 and 22' as shown in enlarged details in Fig. 4.

The lateral or cross members 22 are the supporting members shown in the form of flanged or I beams while the members 22' are merely dummy sections which, if desired, can be substituted for the lateral supporting members 22. These lateral members 22 and 22' are arranged to slip into the open links 21 after the links 17 are in place and are bolted thereto by means of bolts 23 passing through the upturned ends of the links 21 and the central or web section of the lateral members 22 and 22'. It will be observed that one flange of each double-flanged cross member or I beam passes through and fits near its ends in two of the links 21, the web connecting the two flanges or cross member passing between the open-mouthed link extensions which act as clamps.

To each lateral member or I beam 22 is secured an inclined support 24 by bolts 25 to which is secured the overlapping pans or buckets 26 of any desired shape, the pans or buckets 26 as illustrated cross sectionally in Fig. 3 forming a curved trough. The containers, pans or buckets 26 due to the inclined supports 24 and because of the necessity of the overlapping of each bucket are slightly inclined from the horizontal as shown in Fig. 1. This overlapping of the pans or buckets provides a continuous trough conveyer belt upon which the materials to be conveyed are loaded and conveyed to the desired location.

Beneath the chains are idle rollers 27 on shafts 28 supported in framework 11 which are in parallel planes with the sprockets 15 to prevent sagging of the chains and pans or buckets when the conveyer is in operation.

If it is desired to operate the conveyer belt as a lifting belt so as to lift and convey materials in a vertical or inclined direction where a continuous trough conveyer is unsuitable, the supports 24 with the pans or buckets 26 secured thereto which form a horizontal conveying trough are removed from the lateral members or I beams 22 by removing bolts 25 and attaching to every other lateral member or I beam 22 a support for a lifting bucket of any suitable shape.

It will be readily seen that the conveying apparatus can be adjusted to any desired length by adding or removing sections of the supporting frame structure and sections of the chain belts with the necessary elements secured thereto. Furthermore the conveying apparatus as described is so constructed that the interchangeable parts can be replaced if breakage occurs without the necessity of replacing the entire moving elements.

While this invention is illustrated and described more particularly with reference to endless sectional conveyers for sand, gravel, brick and the like, the invention is not confined thereto but is intended to cover any other uses or modifications within the scope of the appended claims.

I claim:

1. A conveyer comprising spaced longitudinal chain members, cross members secured thereto, bucket members secured to said cross members, said cross members having flanges passing through the links of said chain members and secured thereto.

2. A conveyer comprising spaced longitudinal chain members, cross I beams secured thereto, bucket members secured to said cross I beams, said chain members having open links conforming to the flanges and webs of said I beams and secured to the ends of said cross I beams.

3. A belt conveyer comprising spaced chain members, sprockets for said chain members, and flanged lateral members for spacing said chain members, said chain members having some of their links shaped to fit around and clamp the flanged portions of said lateral members, said lateral members being detachably connected to said links.

4. A conveyer comprising a pair of endless chains spaced apart and each including links having open-mouthed portions, cross members secured to said chains, said cross members each comprising two parallel flanges spaced apart and a connecting web and material containers carried by said chains, the web of each cross member passing through the open-mouthed portions of a pair of said links, one flange of each cross member fitting in the openings of the links with which it is associated, and one of said containers being mounted on the other flange.

5. A conveyer comprising a pair of endless chains spaced apart, cross members each comprising two flanges spaced apart and a connecting web, and material containers carried by said chains, one flange of each cross member being fixed to the chains and one of the containers being mounted on the other flange.

JAMES C. MEEM.